United States Patent

[11] 3,551,583

| [72] | Inventor | Johann Buser<br>Basel, Switzerland |
| --- | --- | --- |
| [21] | Appl. No. | 723,511 |
| [22] | Filed | Apr. 23, 1968 |
| [45] | Patented | Dec. 29, 1970 |
| [73] | Assignee | Bufix-Konsortium Dr. Gottfried Burger,<br>Dr. Heinrich Schutzger, Benno Buser-<br>Wechsler<br>Liestal, Switzerland<br>a firm |

[54] MULTIPURPOSE JUNCTION BOX FOR CONDUCTOR WIRES ADAPTED FOR INSTALLATION WITH A COMBINED CABLE
5 Claims, 9 Drawing Figs.

[52] U.S. Cl. .................................................. 174/41,
174/59
[51] Int. Cl. .................................................. H02g 7/00
[50] Field of Search .......................................... 174/40, 41,
43, 44, 59, 60, 61, 62, 63, 64

[56] References Cited
UNITED STATES PATENTS

| 2,273,167 | 2/1942 | Anderson .................... | 174/41UX |
| --- | --- | --- | --- |
| 2,299,607 | 10/1942 | Averbach .................... | 174/41 |
| 2,861,120 | 11/1958 | Park ............................ | 174/59 |

Primary Examiner—Lewis H. Myers
Assistant Examiner—D. A. Tone
Attorney—Jacob L. Kollin ABSTRACT: The invention provides a multipurpose junction box for installing conductors, wires and cables for supplying points of consumption of electrical power; said multipurpose junction box being in the form of a distributing, through-type, branch-type and/or terminal box as may be required and so contrived that said box can at least partly undertake supporting and suspending functions in a prefabricated installational network. Said junction box contains terminal strips suitably disposed to permit any desired connection between incoming and outgoing conductors to be established therein.

PATENTED DEC 29 1970
3,551,583
SHEET 1 OF 3
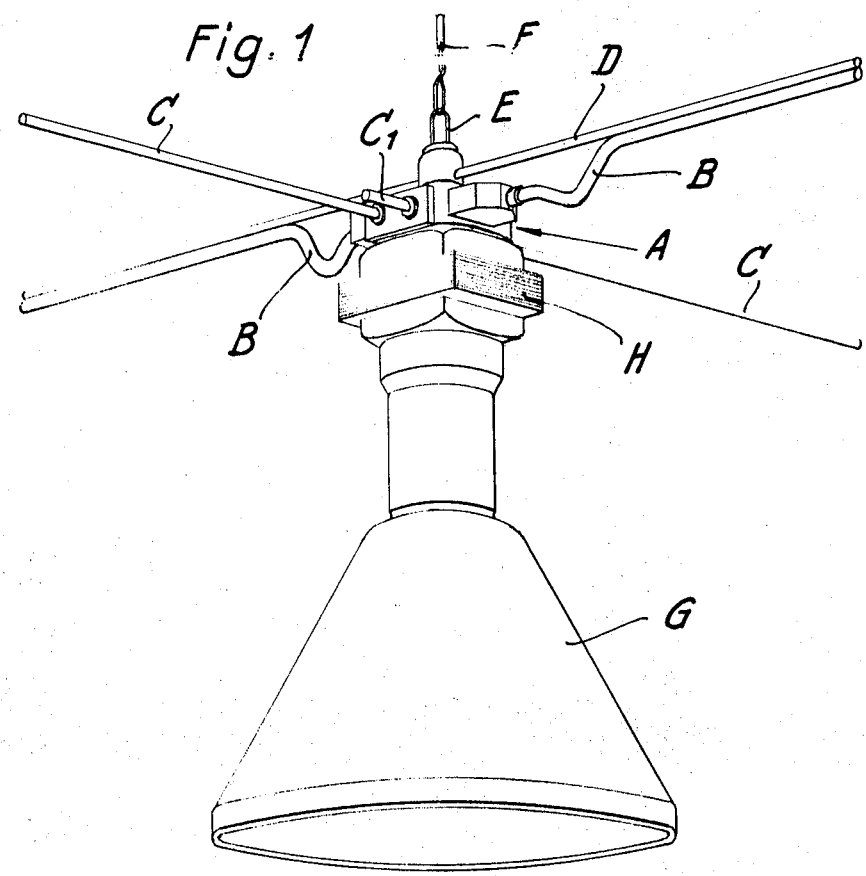
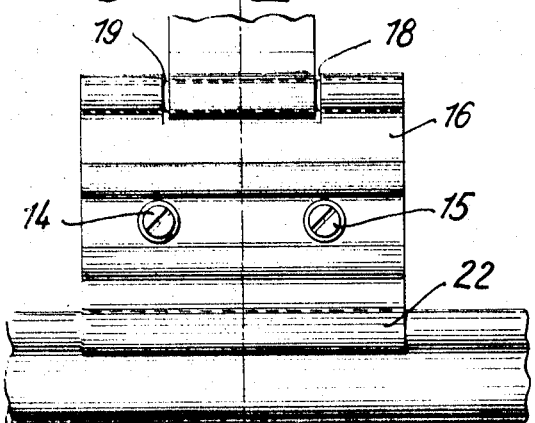
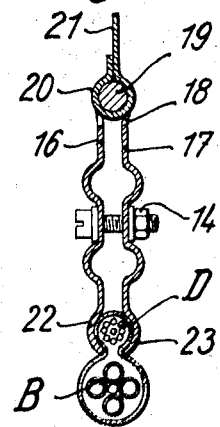
INVENTOR:
JOHANN BUSER
by Jacob L. Kollin
ATTORNEY

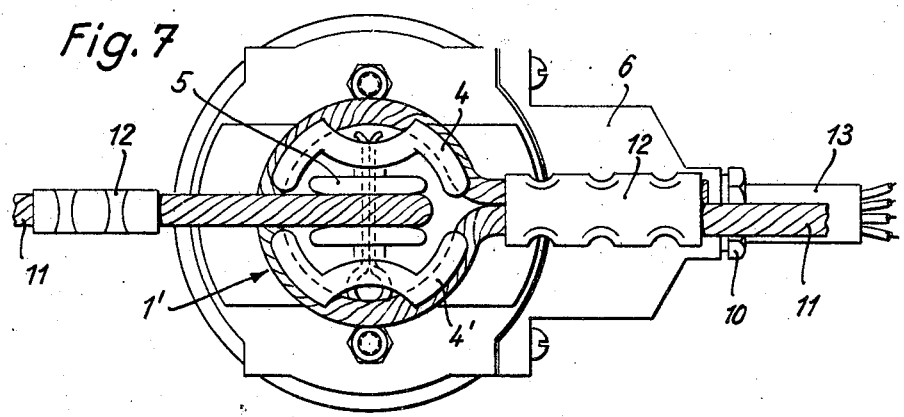
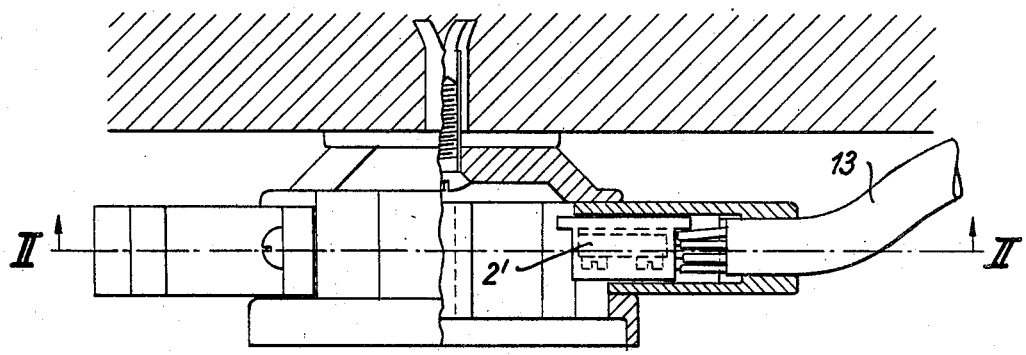
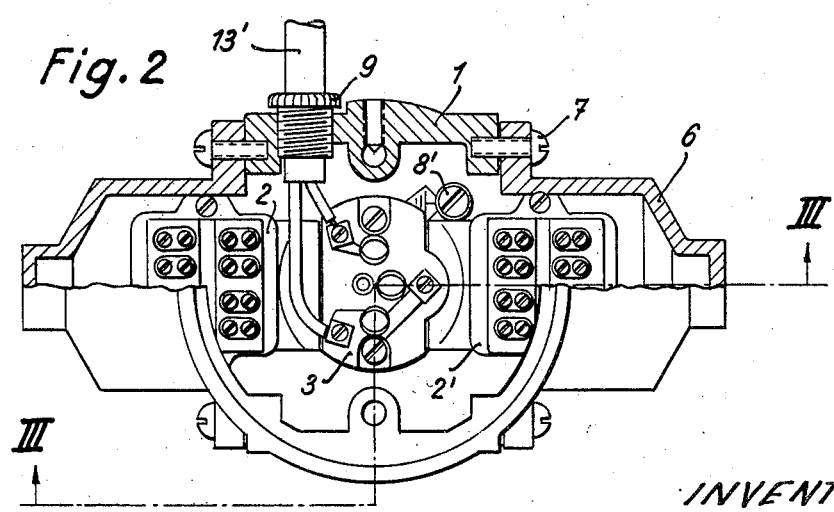

INVENTOR:
JOHANN BUSER

MULTIPURPOSE JUNCTION BOX FOR CONDUCTOR WIRES ADAPTED FOR INSTALLATION WITH A COMBINED CABLE

BACKGROUND OF THE INVENTION

The invention relates generally to junction boxes for installing conductors, wires and cables for supplying points of consumption of electrical power with the necessary current. More particularly, the invention relates to multi-purpose junction boxes for installing an electrical lighting system wherein the lighting fittings and the conductors for supplying the electric current are suspended from supporting cables under the roof or the ceiling of an interior.

To an increasing extent it is now the practice for reasons of cost to base the construction of buildings on the use of prefabricated components and parts. Standardized components of major size are prefabricated at the works and erected with a minimum expenditure of labour and time at the site to construct the complete building. This type of prefabrication has not yet been applied to any appreciable extent to installational work although in some instances the prefabrication of installations, particularly of electrical installations, would also permit considerable savings in cost to be made. That this has not yet been done is probably due to the fact that it has been considered impossible to prefabricate an electrical network completely at the works and to install it as a complete and finished unit in a building. Another reason which has prevented the type of prefabrication from being applied to electrical installational work, particularly to the installation of a lighting system may have been the absence of suitable elements adapted to such a procedure.

SUMMARY OF THE INVENTION

The present invention therefore has for its object the prefabrication of electrical installations in a manner that offers considerable advantages in actual practice.

For achieving this object the invention therefore provides means for installing conductors, wires and cables for supplying points of consumption of electrical power, electrical apparatus and lighting fittings with electric current, and for connecting up at the works said conductors, wires and cables by means of connecting elements in the form of junction boxes and attaching thereto all the necessary fittings including the suspension means to form a prefabricated complete network for at least part of a contemplated installation. The preconnected and prepared network is conveyed to the site for installation, laid out on the floor of the site in the manner of a cable form and hoisted into position as a single prefabricated unit. For performing said installation it is further proposed to provide a junction box in the form of a distributing, through-type, branch-type and/or terminal box as may be required and so contrived that said box can at least partly also undertake supporting and suspending functions in the prefabricated installational network, said junction box containing strip connectors suitably disposed to permit any desired connection between incoming and outgoing conductors to be established inside said box.

Moreover, in a preferred construction of a multipurpose junction box for performing the method according to the invention there may be provided at least two additional terminals eccentrically offset from the center axis of said box and so disposed that sufficient space is available for completing any desired interconnections between them. Moreover, these additional terminals may also have the form of strip connectors adapted for establishing any desired interconnections between a plurality of incoming and outgoing conductors.

BRIEF DESCRIPTION OF THE DRAWINGS

In order that the nature of the invention may be better understood nonlimiting illustrative embodiments of multipurpose junction boxes for use in a prefabricated installational network according to the invention and details thereof will be hereinafter described with reference to the accompanying drawings, in which:

FIG. 1 is a perspective view of part of an installational prefabricated network according to the invention specifically intended for a lighting installation suspended under the roof or ceiling and adapted to be hoisted into position after having been laid out on the floor;

FIG. 2 is a plan view of a multipurpose junction box showing the interior partly in section;

FIG. 3 is an elevational part sectional view of a junction box according to the invention showing the manner of securing the same to a flat base;

FIG. 7 is a view, likewise from above, of a junction box adapted to be suspended between the ends of two supporting cables extending in opposite directions;

FIG. 8 is a hanger for the cables in an installation adapted to be hoisted into position, shown from the side; and FIG. 9 is a section of the hanger in FIG. 8 taken on the line IX-IX in FIG. 8.

DESCRIPTION OF THE PREFERRED EMBODIMENTS

Figure 6:
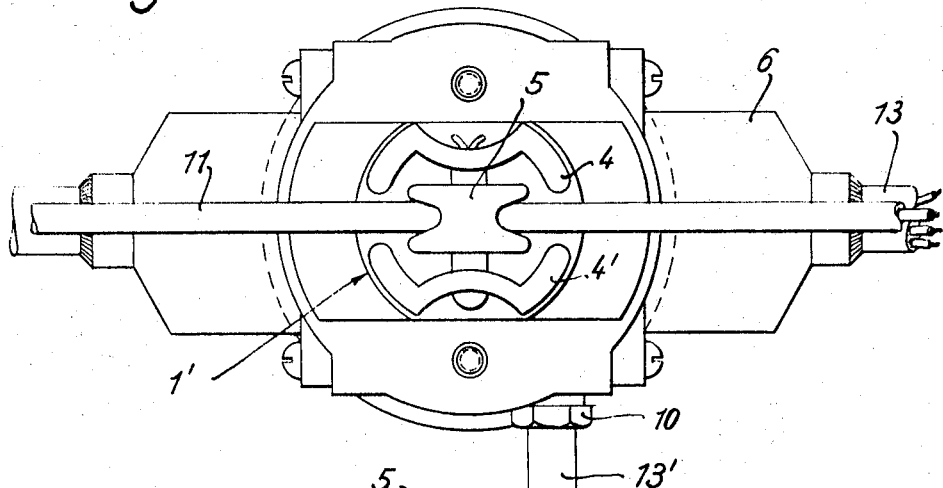
FIG. 6 is a schematic representation of a junction box seen from above, in the form of a through-type box adapted to be suspended from a supporting cable.

FIG. 1 represents part of an electric lighting installation according to the invention of which all the components including all major junctions and connections have been made in the works and which is assumed to be resting on the floor of a large hall ready to be hoisted to the ceiling or to a girder. The equipment comprises a multipurpose junction box A of a kind which will be later described in greater detail, a combination cable B which continues through the junction box A and which can be tapped inside the junction box, a second cable C which likewise continues through the junction box A, possibly a further cable of similar kind marked C1 (cf. the cable marked 13' in FIG. 2), and D is a suspension cable with which the cable B may be combined. For hoisting the entire equipment into place the junction box A is fitted with a hook E and a chain F and at intervals in said chain with a fitting of the kind illustrated in FIGS. 8 and 9. The underside of the junction box A carries a lamp fitting G which is attached thereto by means of screws and suitable fastenings (not shown in the drawings). Assuming that the lamp G is a mercury vapor lamp of the high-pressure type operating at a high voltage an appropriate transformer H may be interposed. The said multipurpose junction box A can be readily connected to the combination cable B without the need of detaching the electrical cable from its associated supporting cable. The junction box casing which has a carrier head through which the supporting cable can pass or to which the end of such a cable can be secured may be fitted with a socket 3 in its center for the reception of a pin-type plug. This will then serve as an electric outlet, if required.

In FIG. 2 and each of the following FIGS. the casing of the junction box is marked 1. It is integrally formed with a carrier head 1' and centrally contains the socket 3 for a pin-type plug as well as an eccentrically located screw terminal 8 for an earthing wire. Moreover, likewise eccentrically located with respect to the socket 3 are terminals 2 and 2' in the form of strip connectors, preferably positioned on diametrically opposite sides of the junction box and suitably spaced. These oppositely located terminals 2 and 2' are screwed into terminal caps 6 of the junction box secured by screws 7 to the junction box casing 1.

Figure 4:
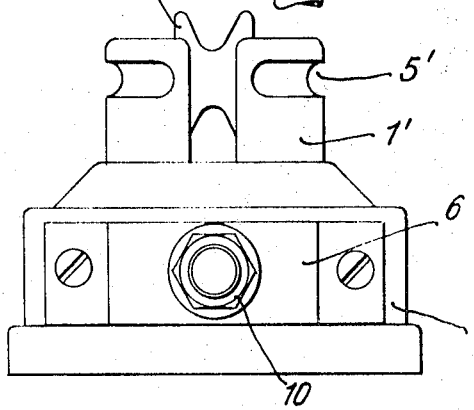
FIG. 4 is a side elevation of the junction box according to FIGS. 2 and 3, but differing from FIG. 3 in that the junction box is adapted to be suspended from the supporting cable by means of a grooved carrier and roller.
Figure 5:
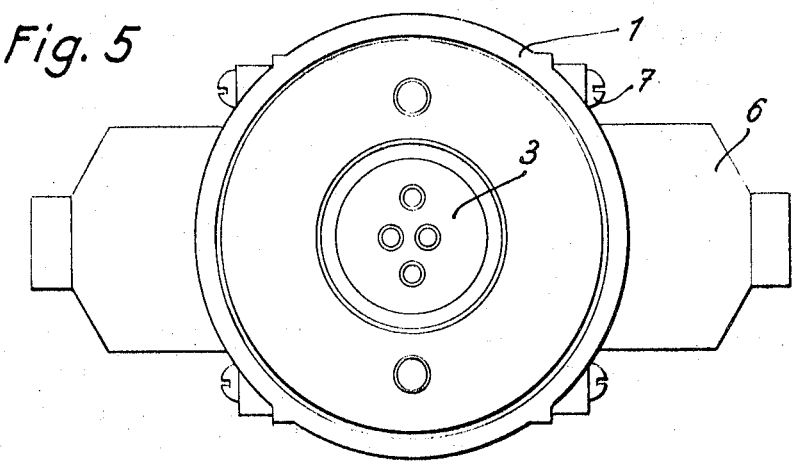
FIG. 5 is a plan view of the junction box according to FIG. 2, showing the provision of a centrally disposed socket for the reception of a pin-type plug.

The carrier head 1' of the junction box illustrated in FIGS. 4, 6 and 7 comprises two spaced, substantially arcuate carrier members 4 and 4' between which a suspension roller 5 is rotatably mounted on a transverse pin. This form of construction of a junction box as proposed by the invention is preferred for prefabricated installations that are to be laid in interiors for a lighting system. If the junction boxes are for open-air use the suspension rollers 5 should preferably be replaced by a transverse carrier member of maximum possible length to permit the fitting that is to be attached to the junction box to be secured against wind pressure by straining wires. The embodiment illustrated in FIG. 2 is a combination distributing through-type, branch and terminal box for cables and like lines. The use of terminal caps 6 makes the illustrated box particularly suitable for the through connection of one conductor 13 of a group of conductors (FIG. 3). Additional inlet and outlet wires may be included. Four inlets and outlets are available for this purpose in the embodiment according to FIG. 2. However, only one supplementary connection 13' which here functions as a supply is shown in FIG. 2 for the sake of simplicity.

The junction boxes shown in FIGS. 2 and 3 are intended for use as through-type boxes, the boxes being assembled on a flat support and providing for the through connection of a standard cable. However, when a junction box is used according to FIGS. 4 and 6, i.e. of the type provided with a carrier head 1' with lateral carrier members 4 and 4' and a centrally disposed roller 5, the prefabricated network is not limited to the employment of a supporting cable and a separate electric supply cable but a combination cable such as an overload cable known under the trade name "Protodur" may also be used. Since in the illustrated junction box two terminals or strip connectors 2 and 2' are eccentrically offset from the center, the conductor ends of the cut electrical cable can be secured to the screw terminals 2 and 2' inside the terminal caps 6 in a completely shockproof and reliable manner. Inside the junction box the used terminals on the strip connector 2 can then be electrically connected to the terminals on the strip 2' as may be required. Sufficient space is available between the two strip connectors 2 and 2' for a diversity of possibilities. If the described junction box is one member in a chain of points of consumption, particularly lamps, then such a chain can be fed by supply lines such as that shown at 13'. The pin-type plug socket in the center of the through-type junction box may serve for establishing an additional direct connection to a consumer, such as a lamp, by pushing a plug into the socket.

The particular form of construction of the carrier head 1' in which grooved carriers 4 and 4' are provided in addition to a carrier roller 5, permits a junction box of the kind illustrated in FIG. 7 in a prefabricated installation to be suspended from two independent suspension cables. This is a considerable convenience for instance when a terminal box according to FIG. 7 is to be used in conjunction with a combination cable in which the conductor cable is combined with the supporting cable. That supporting cable which is merely required to provide mechanical support need not then be associated with a conductor cable at a terminal junction box. The indented sleeves 12 which are shown in FIG. 7 and which are very suitable for securing cable ends may naturally be replaced by any alternative means.

For suspending a combination cable B between existing lamps G from girders of a building, a hanger such as that shown in FIGS. 8 and 9 may be used with advantage. This hanger comprises two strap members 16 and 17 held together by clamping screws 14 and 15. At the top the straps are centrally recessed at 18 for the accommodation of a hinge pin 19. A steel drop hanger 21 is bent over to form a hinge 20 embracing the pin, whereas the upwardly extending end of the drop hanger 21 may be attached in any suitable manner to support or girder (not shown). The two strap members 16 and 17 form semicircular inwardly curved gripper configurations 22 and 23 at their free bottom ends for holding the steel wire armed suspension cable D of a four-core combination cable B.

The above junction box permits unnecessary lengths of conductor to be saved, a feature which is of major advantage in the laying of prefabricated installational equipment. The plug-type socket connector built centrally into the junction box for the reception of a pin-type plug also permits any type of lamp or other apparatus to be electrically connected and mechanically secured with a minimum of trouble.

A junction box as proposed by the invention further permits the conductors or branch conductors secured to the terminals to be suitably interconnected for a common, or each for a separate supply. Moreover, a combination cable for the suspension and supply of a chain of lamps can be readily used. A particularly useful embodiment is one in which, as already mentioned, said combination cables are used which combine a supporting wire cable with a cable containing the conductors in a single unit.

In order to include such a combination cable in the prefabrication of consumer chains, particularly of chains of lamps with or without the provision of branch connections, the electrical conductors of such a combination cable can be cut inside the junction box and reconnected in any desired way in a shockproof manner to permit the consumers to be connected up and supplied in parallel. This facility is a result of the well-spaced disposition of the connector strips 2 and 2' in positions eccentrically offset inside the junction box. The supporting wire rope remains intact and can thus perform its function as a supporting element in the installation and included in prefabricated equipment that can be installed as a unit.

In the provision of chains of lamps which for technical and other reasons should be connected to three phases "R-S-T" in alternation, a suitable junction box must be capable of permitting at least two supply conductors to be provided in order to separate a number of circuits and of distributing the current in such a way that each circuit on one side is electrically isolated from the circuit group on the other side.

Another requirement may arise if within a chain of lamp fittings individual fittings are to be merely emergency lights or merely secondary lights to illuminate passages and interiors temporarily or dimly. The connection of a third supply conductor to a junction box may also serve for connecting up a lamp which is separately connected via the socket of the pin-type connector in the junction box.

A multipurpose junction box as proposed by the invention may also be fitted to be mounted on a flat support either by means of a central fastener or by means of ordinary screws passed through holes in eccentrically positioned lugs. A particularly useful embodiment of the proposed junction box is that which has been described, and which is fitted to be suspended from a supporting rope or cable. The casing of the junction box which is preferably of integral construction includes a carrier head for a through suspension rope or wire or for attachment to the end of a suspension wire or rope.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A multipurpose through-type junction box comprising a connector block provided with a plurality of terminal strips disposed to permit any desired connection between incoming and outgoing conductors to be secured to said terminal strips, at least two of said terminal strips eccentrically offset from the center axis of said connector block to provide sufficient intervening space for making optionally selectable electrical connections within said connector block, a carrier head secured to said connector block, cable suspension means secured to said carrier head, a pair of spaced substantially arcuate members secured to said carrier head and a roller mounted between said arcuate members.

2. A junction box as claimed in claim 1 and a supporting cable extending between said arcuate members and under said roller.

3. A junction box as claimed in claim 1, wherein said arcuate members are formed with grooves, a first securing cable having an end looped about said grooves, a second securing cable having an end engaging about said roller and a pair of indented sleeves securing each of said end portions respectively.

4. A junction box as set forth in claim 1, wherein the carrier head and the main casing are of integral construction.

5. A junction box as set forth in claim 1, comprising a built-in socket for the reception of a pin-type plug, located centrally between said eccentrically located terminal strips.